(12) United States Patent
Hite

(10) Patent No.: US 9,575,197 B2
(45) Date of Patent: Feb. 21, 2017

(54) METHOD AND DEVICE FOR MARINE SEISMIC ACQUISITION

(75) Inventor: Damian A. Hite, Houston, TX (US)

(73) Assignee: CGGVERITAS SERVICES (U.S.) INC., Houston, TX (US)

( * ) Notice: Subject to any disclaimer, the term of this patent is extended or adjusted under 35 U.S.C. 154(b) by 1010 days.

(21) Appl. No.: 13/354,516

(22) Filed: Jan. 20, 2012

(65) Prior Publication Data

US 2012/0320711 A1 Dec. 20, 2012

Related U.S. Application Data

(60) Provisional application No. 61/497,727, filed on Jun. 16, 2011.

(51) Int. Cl.
*G01V 1/38* (2006.01)

(52) U.S. Cl.
CPC .................. *G01V 1/3808* (2013.01)

(58) Field of Classification Search
CPC .......... G01V 1/38; G01V 1/3808; G01V 1/28; G01V 1/345; G01V 2210/1293; G01V 2210/1423; G01V 2210/16; G01V 2210/51
USPC ......................... 367/16, 15, 20, 21
See application file for complete search history.

(56) References Cited

U.S. PATENT DOCUMENTS

| | | | |
|---|---|---|---|
| 7,400,552 B2 | 7/2008 | Moldoveanu et al. | |
| 7,830,748 B2 * | 11/2010 | Guigne et al. | 367/58 |
| 8,205,711 B2 | 6/2012 | Hopperstad et al. | |
| 8,483,008 B2 * | 7/2013 | Welker | 367/17 |
| 8,531,912 B2 * | 9/2013 | Soubaras | 367/16 |
| 8,559,265 B2 * | 10/2013 | Moldoveanu et al. | 367/16 |
| 8,588,025 B2 * | 11/2013 | Moldoveanu et al. | 367/15 |
| 2003/0067842 A1 | 4/2003 | Sukup et al. | |
| 2007/0165486 A1* | 7/2007 | Moldoveanu et al. | 367/15 |
| 2007/0230268 A1 | 10/2007 | Hoogeveen et al. | |
| 2008/0267010 A1 | 10/2008 | Moldoveau et al. | |
| 2008/0285381 A1 | 11/2008 | Moldoveanu et al. | |
| 2009/0122640 A1 | 5/2009 | Hill et al. | |

(Continued)

FOREIGN PATENT DOCUMENTS

| | | |
|---|---|---|
| GB | 2 390 902 A | 1/2004 |
| WO | 02/25315 A2 | 3/2002 |

(Continued)

OTHER PUBLICATIONS

Nick Moldoveanu et al., "From Narrow-Azimuth to Wide-and Rich-Azimuth Acquisition in the Gulf of Mexico"; first break, vol. 24; Special Topic Marine Seismic; Dec. 2006; pp. 69-76.

(Continued)

*Primary Examiner* — Isam Alsomiri
*Assistant Examiner* — Amienatta M Ndure Jobe
(74) *Attorney, Agent, or Firm* — Patent Portfolio Builders PLLC

(57) ABSTRACT

Method and system for improving azimuth distribution. The system includes plural streamers towed by a streamer vessel; a central source towed by the streamer vessel; first and second front sources located in front of the plural streamers along a traveling direction of the streamer vessel; and first and second tail sources located behind of the plural streamers along the traveling direction. The offset distance between the first and second tail sources, along a cross-line direction, is larger than an offset distance between the first and second front sources.

20 Claims, 17 Drawing Sheets

(56) References Cited

U.S. PATENT DOCUMENTS

| | | | |
|---|---|---|---|
| 2011/0158044 A1* | 6/2011 | Moldoveanu et al. | 367/20 |
| 2011/0176384 A1* | 7/2011 | Soubaras | 367/21 |
| 2011/0199857 A1 | 8/2011 | Garden | |
| 2012/0002503 A1 | 1/2012 | Janiszewski et al. | |
| 2012/0033525 A1 | 2/2012 | Abma et al. | |
| 2012/0092956 A1 | 4/2012 | Soubaras | |
| 2012/0257474 A1* | 10/2012 | Cambois et al. | 367/16 |

FOREIGN PATENT DOCUMENTS

| | | |
|---|---|---|
| WO | WO 0225315 A2 * | 3/2002 |
| WO | 2009/092069 A1 | 7/2009 |
| WO | 2011/057324 A1 | 5/2011 |

OTHER PUBLICATIONS

Mike Howard et al., "Rich Azimuth Marine Seismic, A Cost Effective Approach to Better Subsalt Images"; first break, vol. 25; Focus on Azimuth; Mar. 2007; pp. 63-68.

Mike Howard, "Marine Seismic Surveys with Enhanced Azimuth Coverage: Lessons in Survey Design and Acquisition"; The Leading Edge; Apr. 2007; pp. 480-493.

Simon Baldock et al., "Orthogonal Wide Azimuth Surveys: Acquisition and Imaging"; SEG San Antonio 2011 Annual Meeting SEG; pp. 147-151.

Intellectual Property Office Search Report in corresponding Great Britain Patent Application No. 1210344.6 dated Oct. 11, 2012.

* cited by examiner

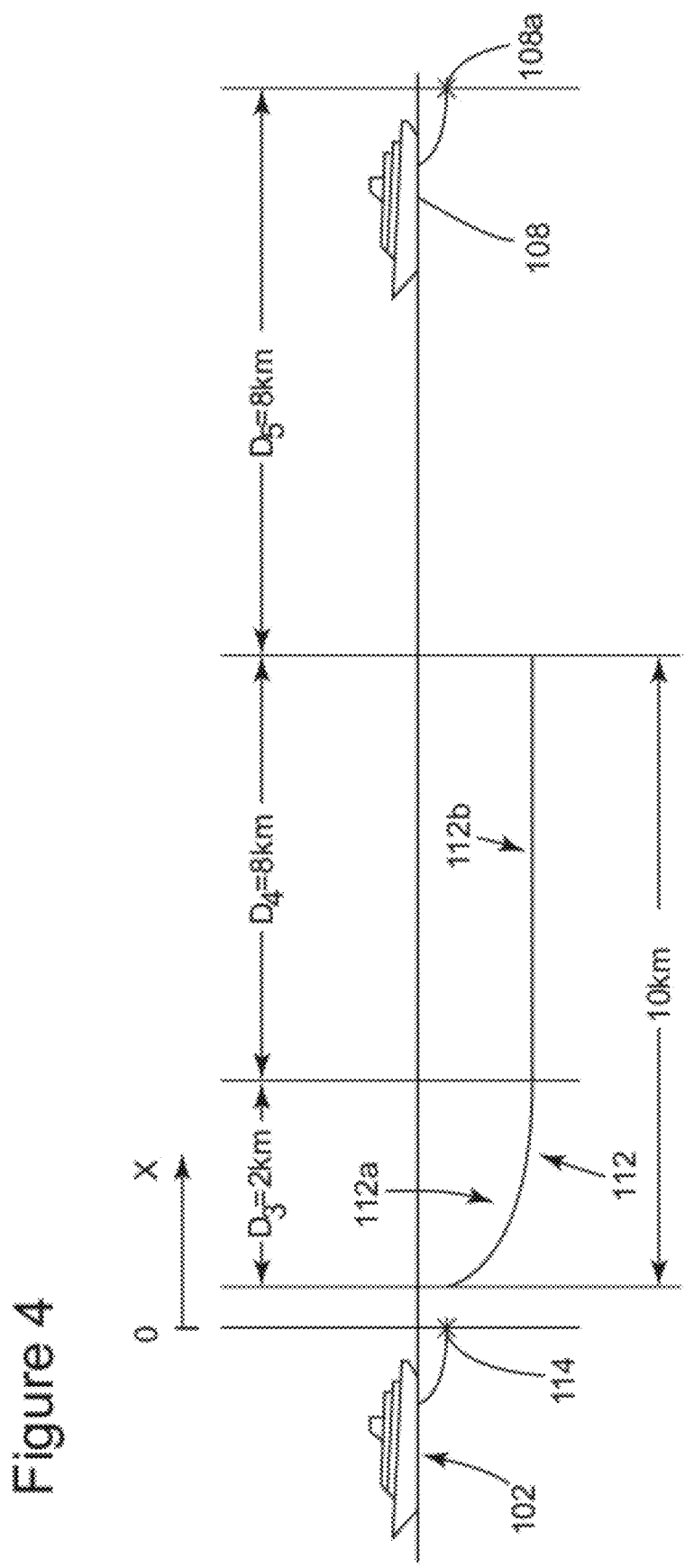

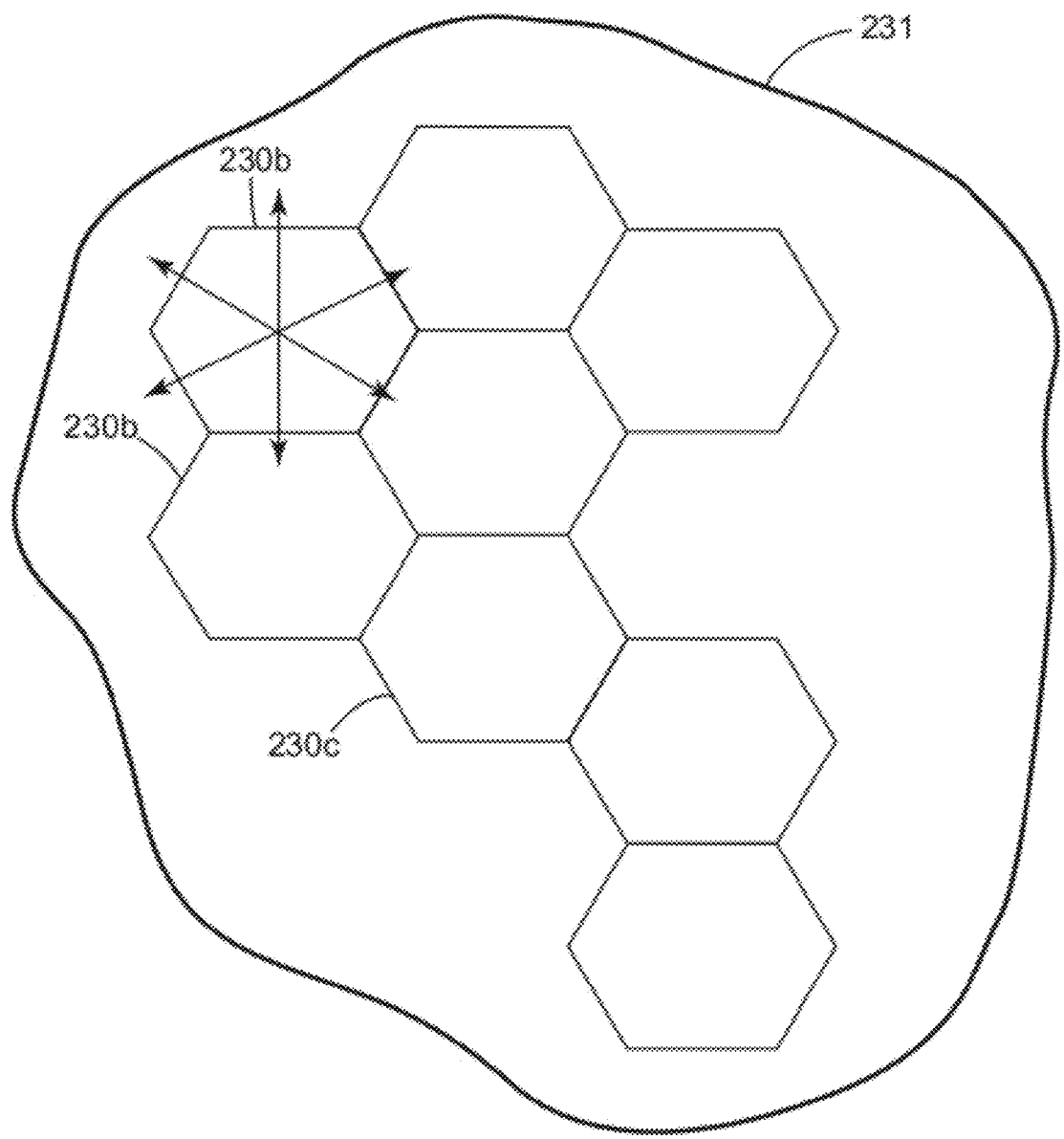

METHOD AND DEVICE FOR MARINE SEISMIC ACQUISITION

CROSS-REFERENCE TO RELATED APPLICATIONS

This is a Non-Provisional application which claims priority under 35 U.S.C. §119(e) to U.S. Provisional Application No. 61/497,727 filed on Jun. 16, 2011, the entire contents of which are hereby incorporated by reference into the present application.

BACKGROUND

Technical Field

Embodiments of the subject matter disclosed herein generally relate to methods and systems and, more particularly, to mechanisms and techniques for improved azimuth distribution in seismic data acquisition.

Discussion of the Background

Marine seismic data acquisition and processing generate a profile (image) of a geophysical structure (subsurface) under the seafloor. This profile does not necessarily provide an accurate location for oil and gas reservoirs, but it may suggest, to those trained in the field, the presence or absence of oil and/or gas reservoirs. Thus, providing a high-resolution image of the subsurface is an ongoing process.

For a seismic gathering process, as shown in FIG. 1, a data acquisition system 10 includes a vessel 12 towing plural streamers 14 that may extend over kilometers behind the vessel. One or more source arrays 16 may be also towed by the vessel 10 or another vessel for generating seismic waves. Conventionally, the source arrays 16 are placed in front of the streamers 14, considering a traveling direction of the vessel 10. The seismic waves generated by the source arrays propagate downward and penetrate the seafloor, eventually being reflected by a reflecting structure (not shown) back to the surface. The reflected seismic waves propagate upwardly and are detected by detectors provided on the streamers 14. However, such a method results in data having poor azimuth distribution.

An improvement to this conventional data acquisition method is the use of wide-azimuth (WAZ) acquisition. In a typical WAZ survey, two streamer vessels and multiple sources are used to cover a large sea area, and all sources and streamers are controlled at a uniform depth throughout the survey. WAZ acquisition provides better illumination of the substructure and, thus, a better final image. However, the presence of ghosts (e.g., reflections of waves from the surface of the water back to the receivers of the streamers) in the acquired data still affects the final image due to the presence of notches.

A newer approach, rich-azimuth (RAZ) acquisition, shows promising signs for improving the final image. RAZ acquisition is the combination of multi-azimuth acquisition and wide-azimuth geometry. RAZ acquisition may be implemented by shooting a same cell in three directions, 30°, 90°, and 150°, each direction being shot in two passes. A rose diagram for such a rich-azimuth survey shows the benefits of rich-azimuth towed-streamer acquisition, i.e., continuous azimuth coverage from 0° to 360° and uniform offset distribution from 400 m to 8000 m for a 8000 m long streamer.

However, existing RAZ acquisition can further be improved because the number and distribution of the source arrays is not achieved, the size of the surveyed cell is not optimized, the linking of the surveyed cells is not efficient, the azimuth distribution is not as desired, etc. Accordingly, it would be desirable to provide systems and methods that avoid the afore-described problems and drawbacks, and improve the accuracy of the final image.

SUMMARY

According to an exemplary embodiment, there is a survey acquisition system that includes plural streamers towed by a streamer vessel; a central source towed by the streamer vessel; first and second front sources located in front of the plural streamers along a traveling direction of the streamer vessel; and first and second tail sources located behind the plural streamers along the traveling direction. An offset distance (D2) between the first and second tail sources, along a cross-line direction (Y), is larger than an offset distance (D1) between the first and second front sources.

According to an exemplary embodiment, there is a method for seismic data acquisition that includes towing plural streamers with a streamer vessel; towing a central source with the streamer vessel; towing first and second front sources, located in front of the plural streamers along a traveling direction (X) of the streamer vessel, with corresponding front towing vessels; and towing first and second tail sources, located behind the plural streamers along the traveling direction (X), with corresponding tail towing vessels. An offset distance (D2) between the first and second tail sources, along a cross-line direction (Y), is larger than an offset distance (D1) between the first and second front sources.

According to still another exemplary embodiment, there is a survey acquisition system that includes a streamer vessel; plural streamers towed by the streamer vessel; a central source towed by the streamer vessel; first and second front vessels; first and second front sources located in front of the plural streamers along a traveling direction (X) of the streamer vessel and configured to be towed by the first and second front vessels; first and second tail vessels; and first and second tail sources located behind the plural streamers along the traveling direction (X), and configured to be towed by the first and second tail vessels. An offset distance (D2) between the first and second tail sources, along a cross-line direction (Y), is larger than an offset distance (D1) between the first and second front sources. The first and second front sources are offset by a predetermined first distance along the traveling direction. The first and second tail sources are offset by a predetermined second distance along the traveling direction. The first front source and the central source are offset by a predetermined third distance along the traveling direction.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 4 is a schematic diagram of a curved streamer and a large offset source vessel according to an exemplary embodiment;

FIG. 7 is a schematic diagram of a desired subsurface covered with plural hexagonal cells according to an exemplary embodiment;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of RAZ acquisition using a vessel streamer and five sources. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, a system configuration for enriching RAZ acquisition includes a streamer vessel configured to tow plural streamers and a source array, and plural source vessels configured to tow one or more source arrays. Two source vessels may be configured to sail parallel to the streamer vessel, substantially at a same position along a traveling direction of the streamer vessel. Two other source vessels are configured to sail behind the streamers of the streamer vessel. In one application, two source vessels are provided ahead (front source vessels) of the streamers and two source vessels are provided behind (tail source vessels) the streamers along the traveling direction.

According to another exemplary embodiment, the tail source vessels may be provided with a larger cross-line separation than the front source vessels. In still another exemplary embodiment, the streamers may be provided not in a parallel arrangement, but rather having a dovetail-like (fan) arrangement. According to still another exemplary embodiment, the streamers may have a variable depth along a first portion and then a constant depth along a second portion. Still, in another application, no two source arrays are at the same inline position along the traveling direction. These embodiments are now discussed in more detail below.

Figure 1:
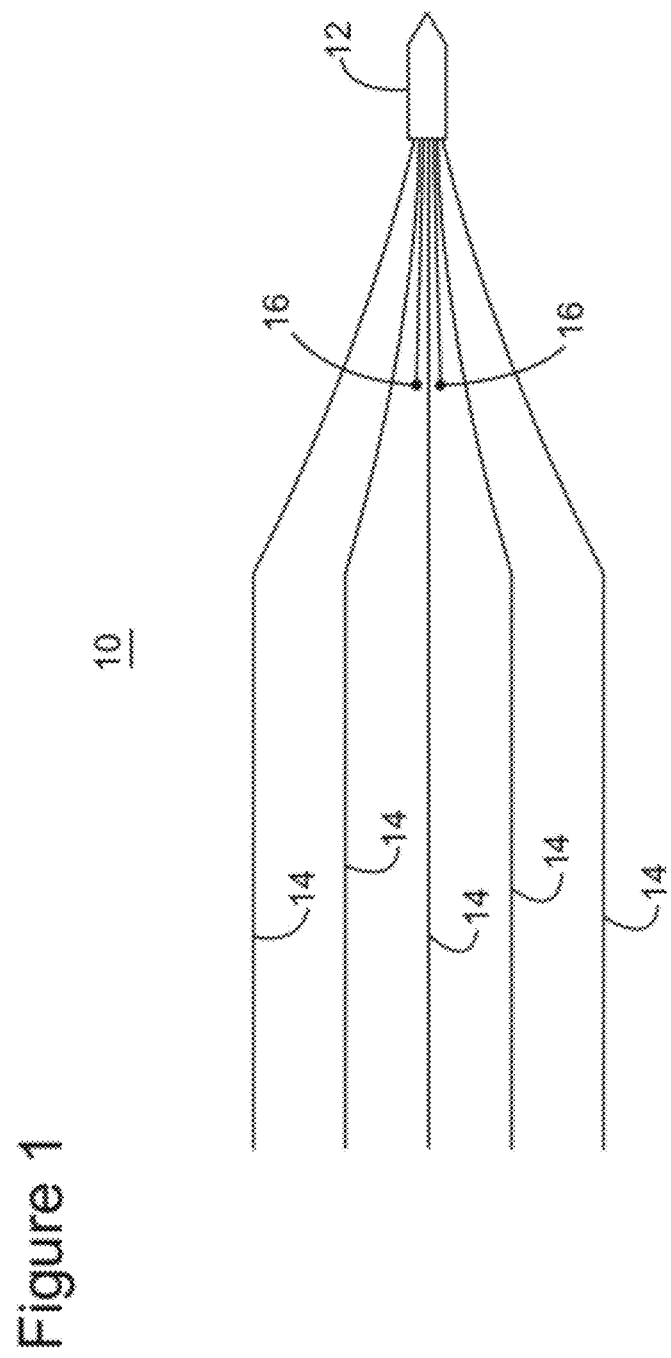
FIG. 1 is a schematic diagram of a conventional seismic data acquisition system.
Figure 2:
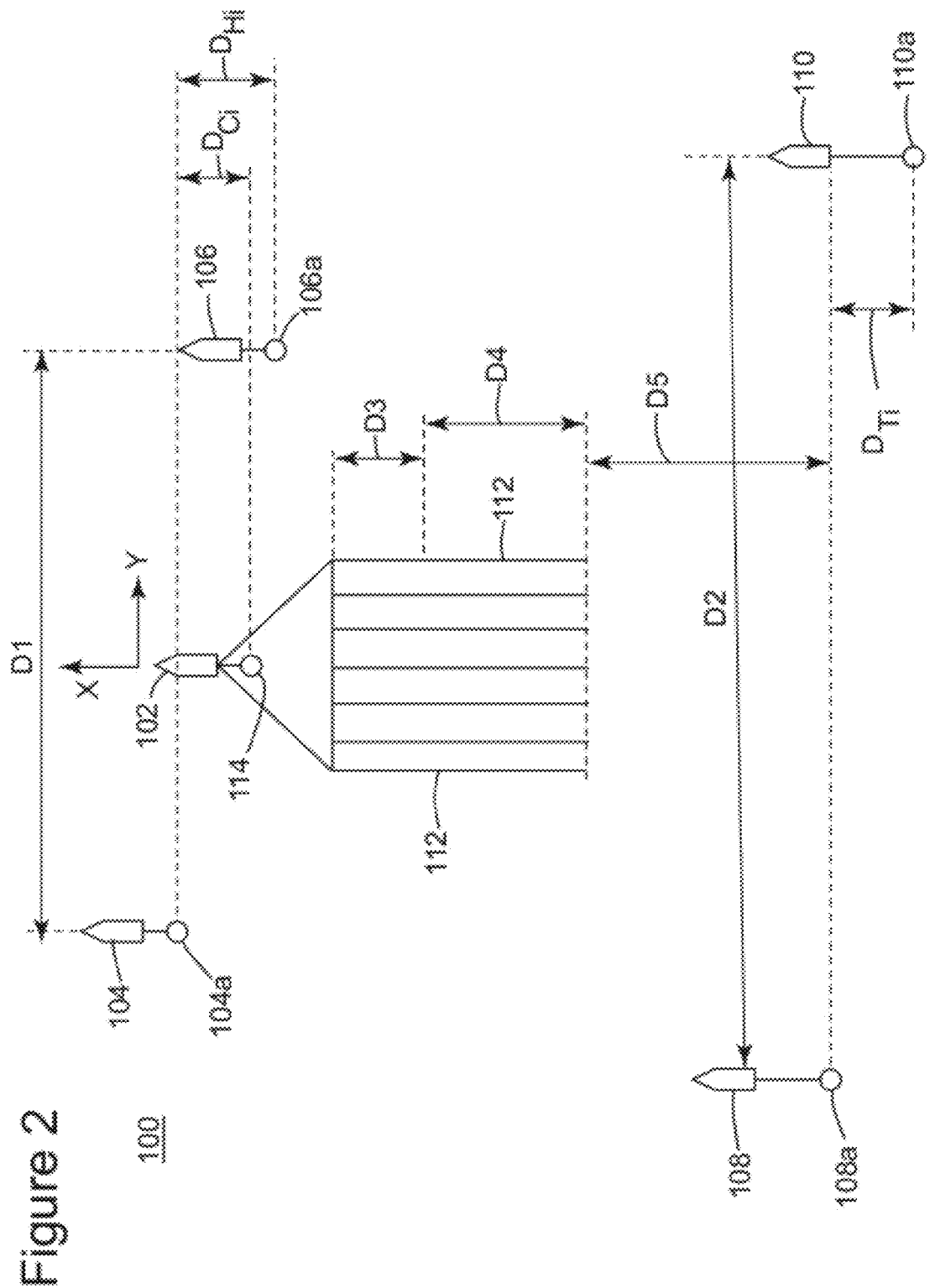
FIG. 2 is a schematic diagram of a novel seismic data acquisition system according to an exemplary embodiment.
Figure 3:
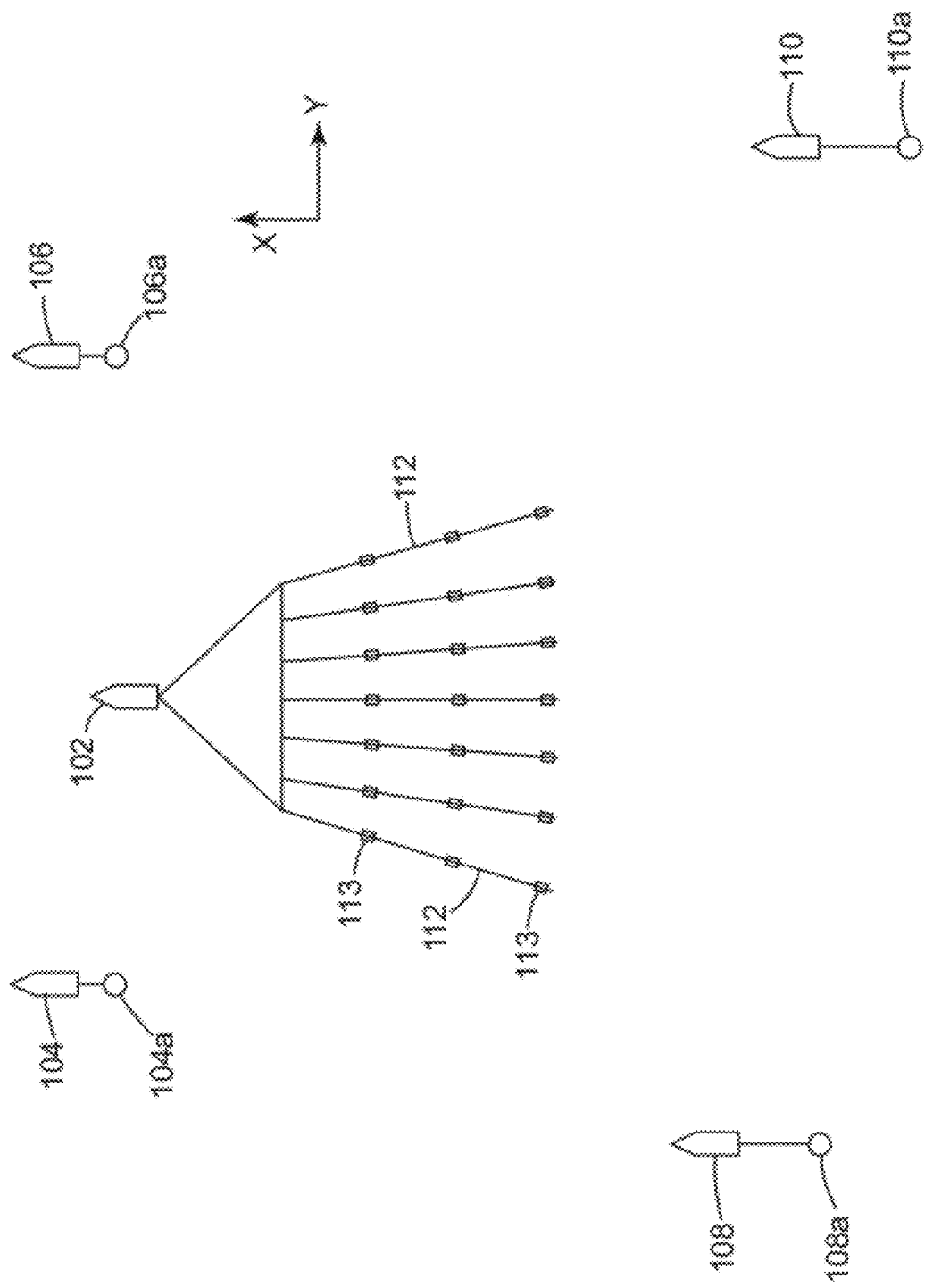
FIG. 3 is a schematic diagram of another novel seismic data acquisition system according to an exemplary embodiment.

According to an exemplary embodiment illustrated in FIG. 2, there is a seismic acquisition system 100 that includes a streamer vessel 102 and four source vessels 104, 106, 108 and 110. The streamer vessel 102 tows plural streamers 112 and, optionally, a source array 114. The source vessels tow corresponding source arrays 104a, 106a, 108a, and 110a. The source arrays may include one or more individual sources. An individual source may be, for example, an air gun. The streamers 112 are substantially parallel in this embodiment. However, as shown in FIG. 3, the streamers 112 may be distributed in a dovetail-like shape. In one application, the streamers 112 are fanned in a horizontal plane (substantially parallel to the water surface) so that they make an angle of at least 2 degrees with each other. To achieve this arrangement, birds 113 may be located on each streamer 112 as shown in FIG. 3, for maintaining the streamers at the desired positions. The birds are devices capable of maintaining a vertical and/or horizontal position in water.

Returning to FIG. 2, it is noted that the X axis corresponds to the traveling direction of the vessels, also known in the art as the inline, and the Y axis, which is perpendicular to X axis, is known in the art as the cross-line. With this convention, a cross-line distance D1 between sources 104a and 106a (front sources) may be approximately 1200 m while a cross-line distance D2 between sources 108a and 110a (tail sources) may be approximately 2400 m. A central source 114 may be placed at half distance between the front sources. These numbers are exemplary and not intended to limit the exemplary embodiments. However, a characteristic of this exemplary embodiment is that the separation distance between the tail sources is larger than the separation distance between the front sources. In one application, the separation distance between the tail sources is substantially double the separation distance of the front sources.

Another characteristic of this exemplary embodiment is the inline distance between the sources. Considering the front sources 104a and 106a, it is noted that there is an inline displacement $D_{HI}$ between them. The central source 114 may also be displaced inline (e.g., $D_{CI}$) relative to each of the front sources. A similar inline displacement $D_{TI}$ may be implemented for the tail sources 108a and 110a. The values for these inline displacements vary from survey to survey, depending on various factors such as, for example, length of streamers, number of streamers, depth of sea bottom, etc.

The streamers 112 may be towed to be substantially parallel or slanted to the water surface. As shown in FIG. 2, the streamers may have a length D3+D4 (to be explained later) and an offset between an end of the streamer and the tail source 108a is D5. In one application, the streamers may have a curved profile, as shown in FIG. 4 (e.g., Broadseis configuration originated by CGGVeritas, France). Supposing that the streamer 112 shown in FIG. 4 has a length of, for example, 10 km, the curved portion 112a may have a length D3=2 km and the flat portion 112b may have a length D4=8 km. For these specific values, an offset of the tail source 108a relative to an end of the streamer (along the X axis) is about D5=8 km, i.e., substantially equal to the flat portion of the streamer. This is considered a large offset in the industry. As disclosed in various patent applications of CGGVeritas, lengths of the curved portion and the flat portion differ from survey to survey and, thus, the numbers disclosed in this embodiment are exemplary.

For a 10 km long streamer with a flat portion of 8 km, it is expected that the tail source should be 8 km away from the end of the streamer to avoid having shallow tow data in the long offset gathers when using the Broadseis method. Further, this offset also allows for feather variations to be minimized.

The five sources may be fired using various schemes. One scheme is to shoot the sources sequentially, for example, at 37.5 m intervals (i.e., shoot a first front source, wait for the first front source to travel 37.5 m along the X axis, and then shoot the central source, and so on). The value of 37.5 m is exemplary and is based on the traveling speed of the streamer vessel. In this way, the sources are fired when they have the same inline position during a firing sequence. A firing sequence includes the sequential firing of each source once. Another scheme is to shoot the sources almost instantaneously, with random time delays. It is noted that for a 20 km offset, the tail sources need to be shot until the end of the full-fold boundary.

However, such a long offset has an impact on the survey duration. Survey duration is an important economic factor when designing a seismic survey. A short-duration survey implies a reduced-price survey. To be competitive, survey duration needs to be optimized.

Figure 5B:
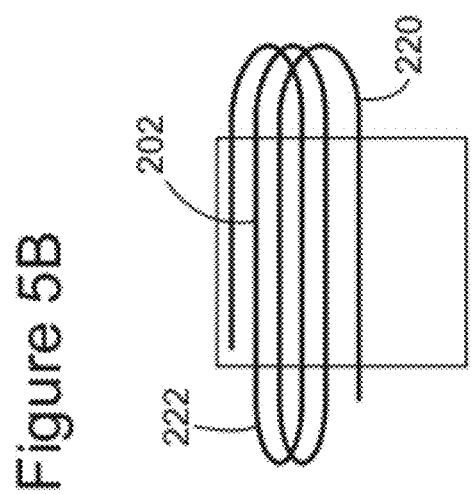
FIGS. 5a and 5b are schematic diagrams of a desired subsurface covered with rectangular cells and a path of a vessel across a rectangular cell.
Figure 5A:
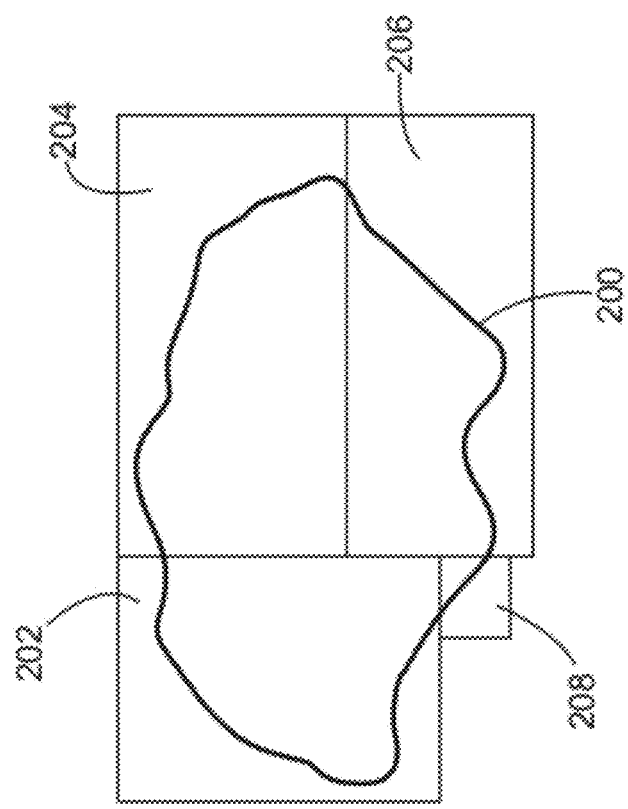

Thus, in the following exemplary embodiments, it is discussed how to select the best shape of a surveying cell and how to select the optimal size of the selected cell for reducing survey time. Those skilled in the art would recognize that when a company needs a seismic survey of a certain plot, they provide the plot to the seismic survey operator. As an example, it is assumed that the shape of a plot 200 is the one shown in FIG. 5a. The seismic survey operator typically "covers" this plot 200 with one or more rectangular cells 202, 204, 206 and 208 and then calculates the path 220 of the streamer vessel 102 as shown in FIG. 5b. FIG. 5b shows the path 220 only for a single cell 202. However, the path is similar for other cells.

Figure 6A:
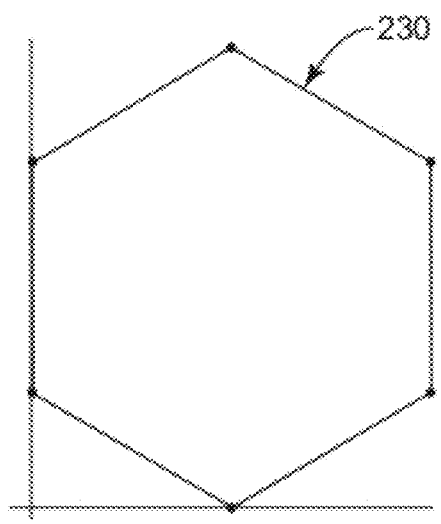
FIGS. 6a-d are schematic diagrams of a hexagonal cell and traveling directions of a vessel across the hexagonal cell according to an exemplary embodiment.

It is noted that the turning portions 222 of the path 220 account for survey time that is not used to acquire data. Thus, it is desirable that the traveling time of the vessels associated with the turning portions 222 be minimized for any survey. According to an exemplary embodiment, such a goal is achieved when using a hexagonal cell 230 as shown in FIG. 6a. A hexagonal cell, as discussed next, offers the advantage of reduced turning times for vessels and has a shape that easily connects to other hexagonal cells.

Figure 6B:
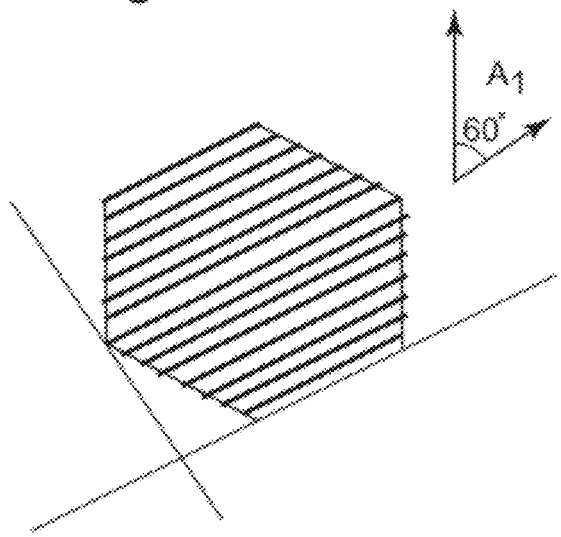
Figure 6C:
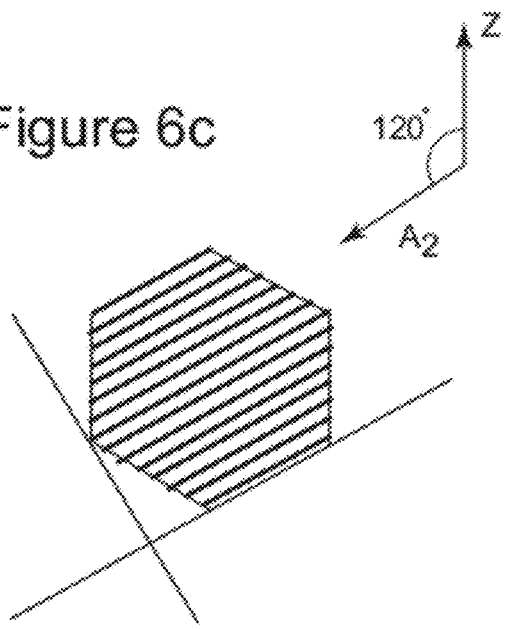
Figure 6D:
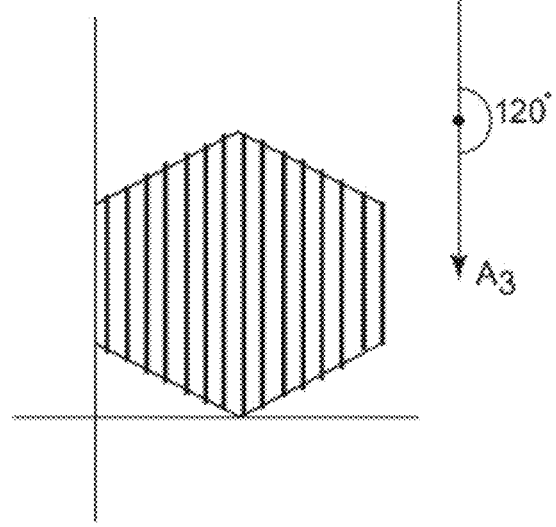

According to an exemplary embodiment, the streamers 112 may be towed along a first axis A1, that makes 60 degrees with a vertical axis Z, as shown in FIG. 6b. The same streamers are then towed over the same hexagonal cell 230 along a second axis A2, that makes 120 degrees with the axis Z, as shown in FIG. 6c. The streamers are then towed a third time over the same hexagonal cell 230 along a third axis A3, that makes 180 degrees with the axis Z, as shown in FIG. 6d. The order in which the streamers are towed along axes A1 to A3 may be the one disclosed above or a different order. Thus, the present setup achieves a large azimuth coverage of the subsurface by having the same subsurface sampled from three different directions.

Further, as shown in FIG. 7, multiple hexagonal cells 230a-c may be connected to extend a survey in any direction, thus forming a honeycomb design. The hexagonal cells are used to "cover" a desired subsurface 231. FIG. 7 shows only a few hexagonal cells partially covering the desired subsurface. However, more or fewer cells may be necessary to fully cover the desired subsurface. The hexagonal cells interlock with each other, leaving no full-fold gaps. Connecting multiple honeycombs before the start of the survey further increases the efficiency of the survey.

For a vessel to follow axes A1 to A3 as shown in FIGS. 6b-d, the vessel needs to turn multiple times. It can be shown that the number of turns and the angle for the turns depend on the size of the hexagonal cell 230. Thus, according to an exemplary embodiment, the size (area) of the hexagonal cell 230 is determined to minimize the time spent turning the vessel for starting a new line of survey.

The size of the hexagonal cell is first determined using an empiric method, and then a mathematical algorithm is used to deterministically calculate the size of the hexagonal cell. The empiric method should validate the mathematical algorithm. For the empiric method, assume a hexagonal cell successively having a radius of 10, 20, 30, 40 and 50 km. The radius of a hexagonal cell is considered to be the distance from the center of the cell to one of its vertices (apexes). For each of these hexagonal cells, one or more parameters are calculated. These parameters may include an average line change, a dead time (e.g., a ratio of line change divided by line change+line length, where the line length is the length of a useful survey line), and how many blocks per day are surveyed. A block has a predetermined size in the seismic surveying industry, for example 3 by 3 miles in the U.S. Gulf of Mexico. Of course, more or fewer parameters may be used to determine the optimal size of a cell.

Figure 8A:
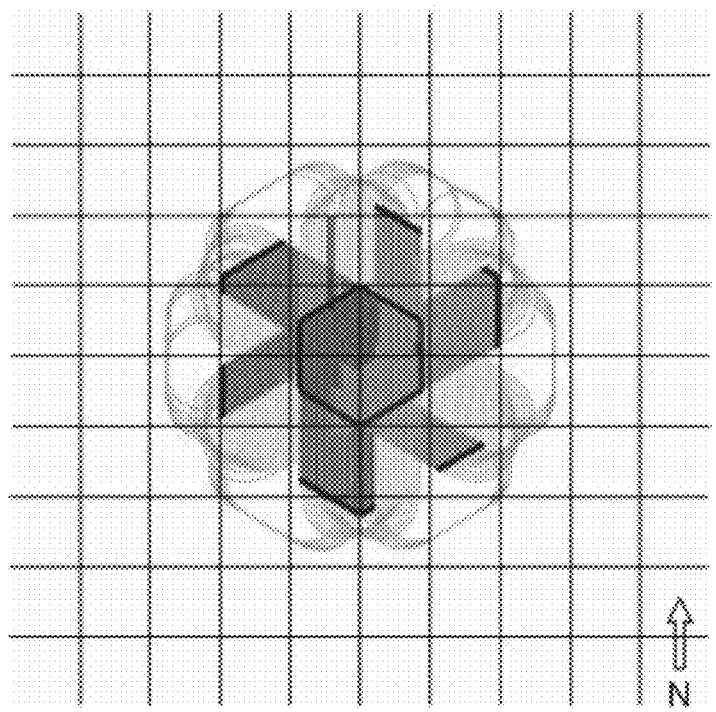
FIGS. 8a-e are schematic diagrams illustrating hexagonal cells with different radiuses.
Figure 8B:
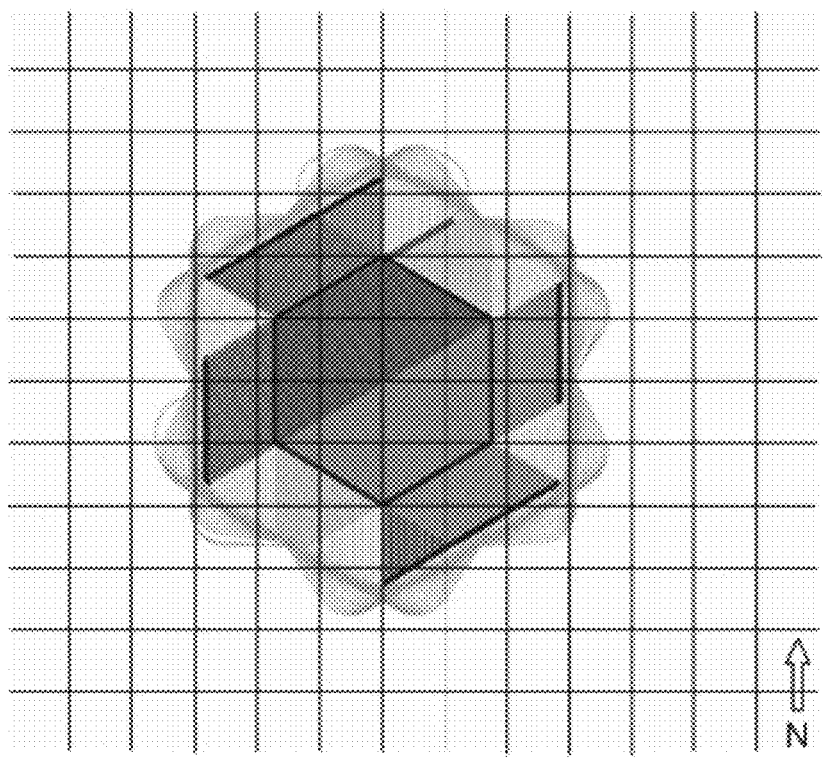
Figure 8C:
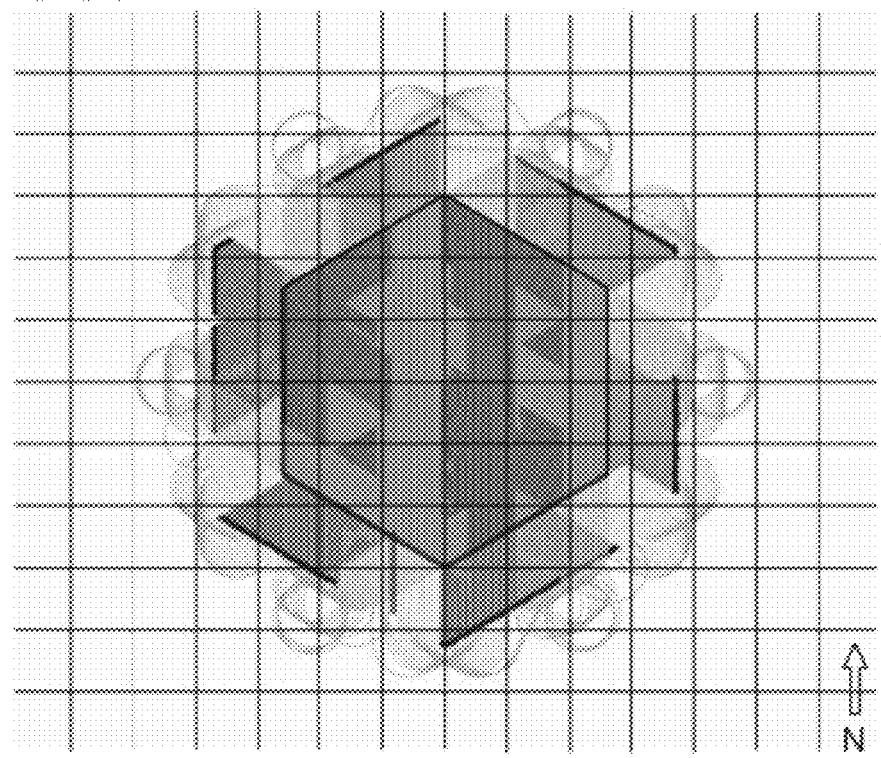
Figure 8D:
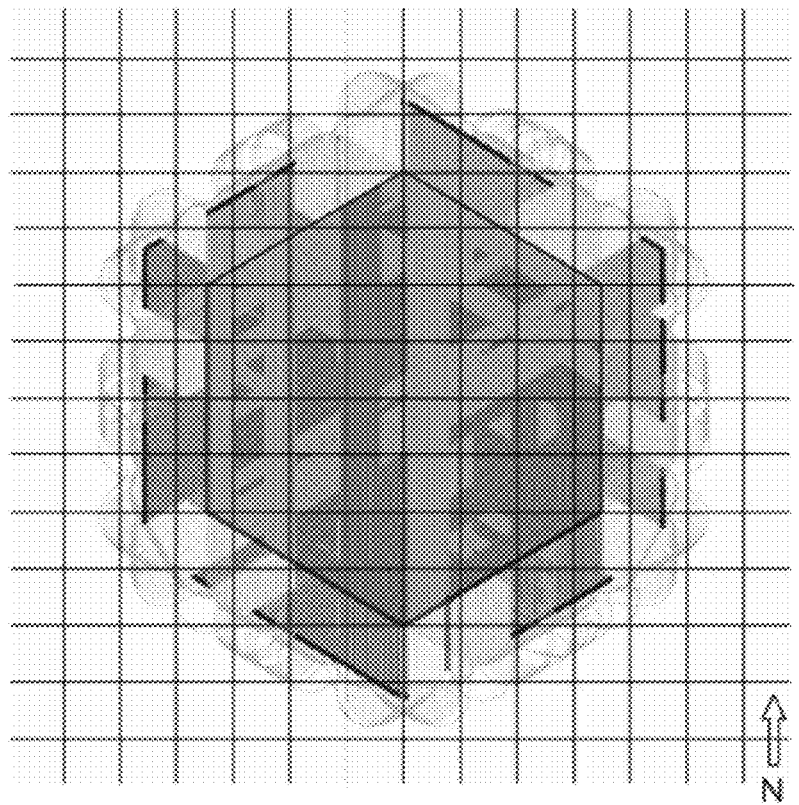
Figure 8E:
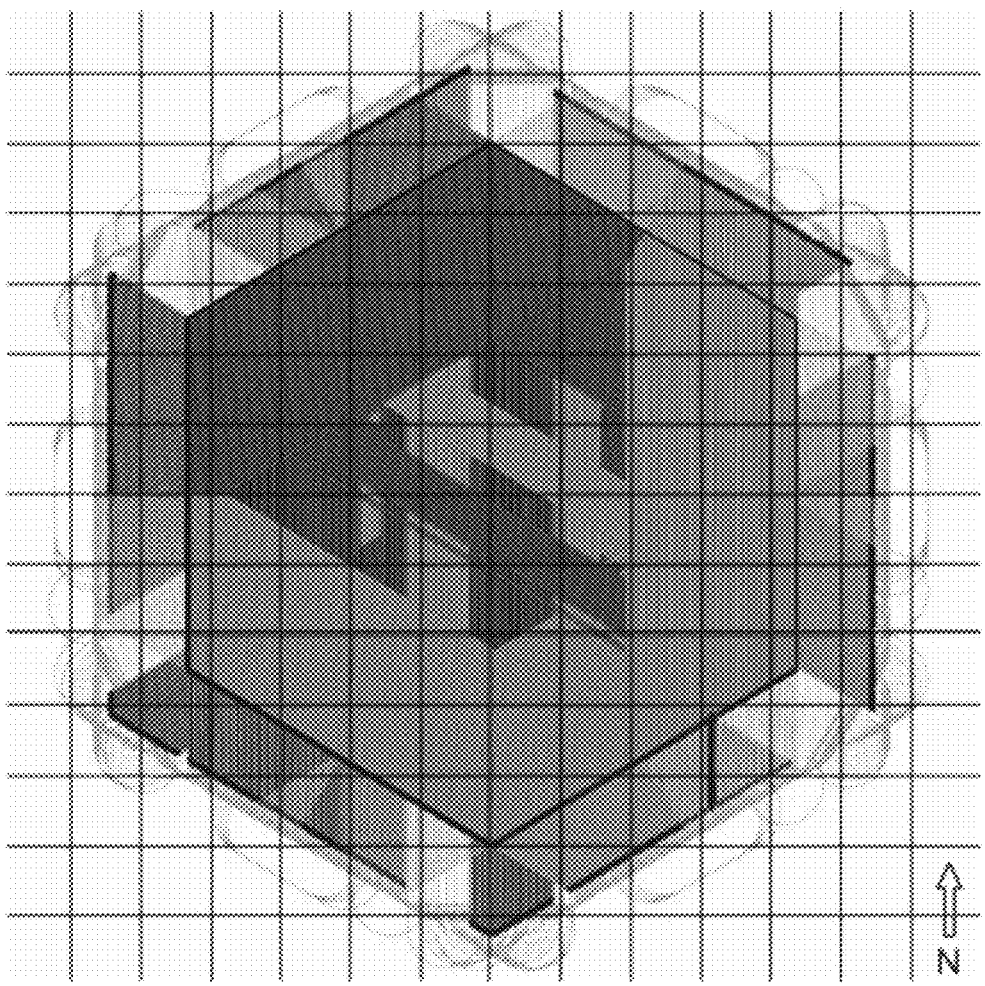

For the 10 km hexagon cell illustrated in FIG. 8a, it is noted that many turns are extended across the outer edges, thus requiring long transits from one line of survey to another. Most of the turns are 240° and, thus, very inefficient. In fact, there are no 120° turns for this size of cell. For the 20 km hexagonal cell illustrated in FIG. 8b, all the line turns are 180°. For the 30 km hexagonal cell illustrated in FIG. 8c, most of the turns are 180°, with some 120° turns. For the 40 km hexagonal cell illustrated in FIG. 8d, the turns include both 120° and 180° turns, but the grouping of the survey lines are asymmetrical. For the 50 km hexagonal cell illustrated in FIG. 8e, most of the surveying lines are 120°, but there are some long turns.

Figure 9:
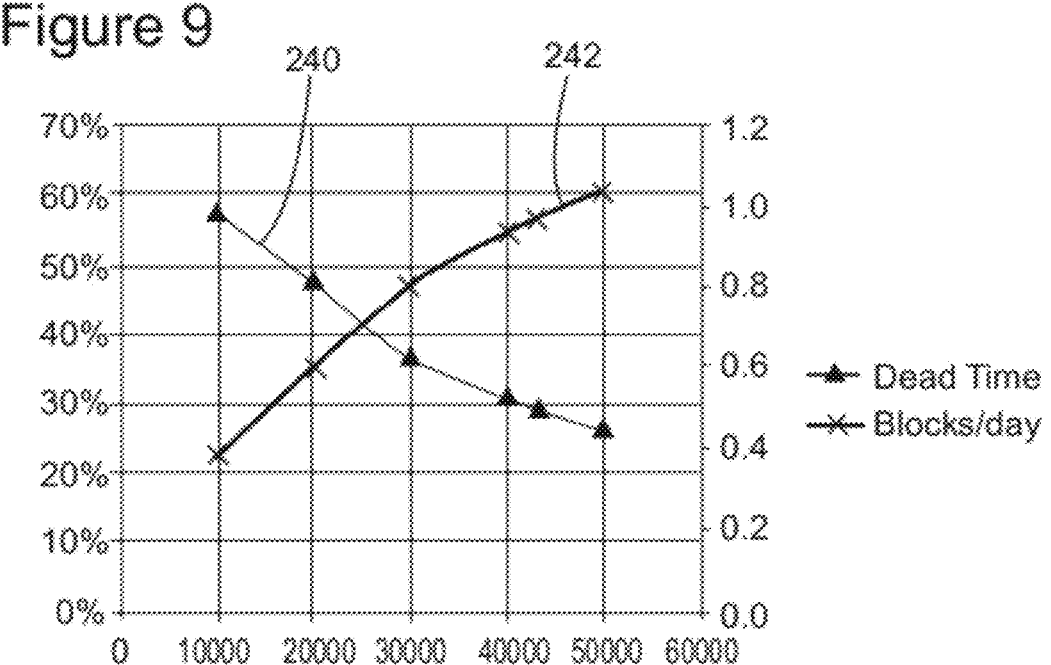
FIG. 9 is a graph showing a dead time curve and a blocks per day curve for various hexagonal cells.
Figure 10:
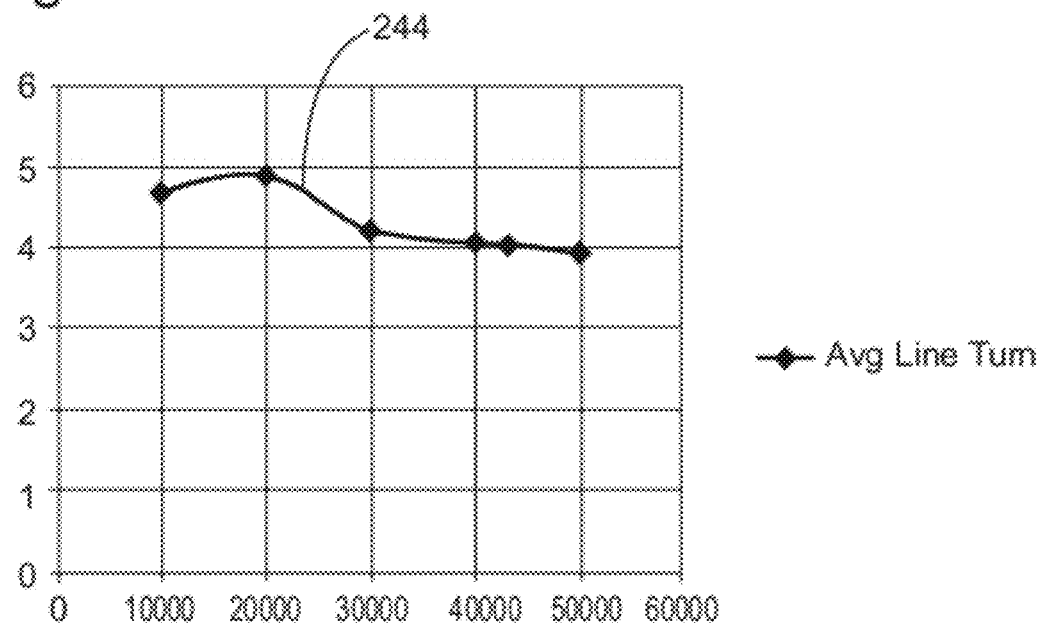
FIG. 10 is a graph showing an average turn line curve for various hexagonal cells.

FIG. 9 shows the dead time curve 240 and the number of blocks per day curve 242, and FIG. 10 shows the average line turn 244 for the hexagonal cells discussed above. Based on the data plotted in these figures, it is empirically determined that the optimized radius of a hexagonal cell is approximately 43 km. This specific size shows a small dead time and high acquisition time.

Figure 11:
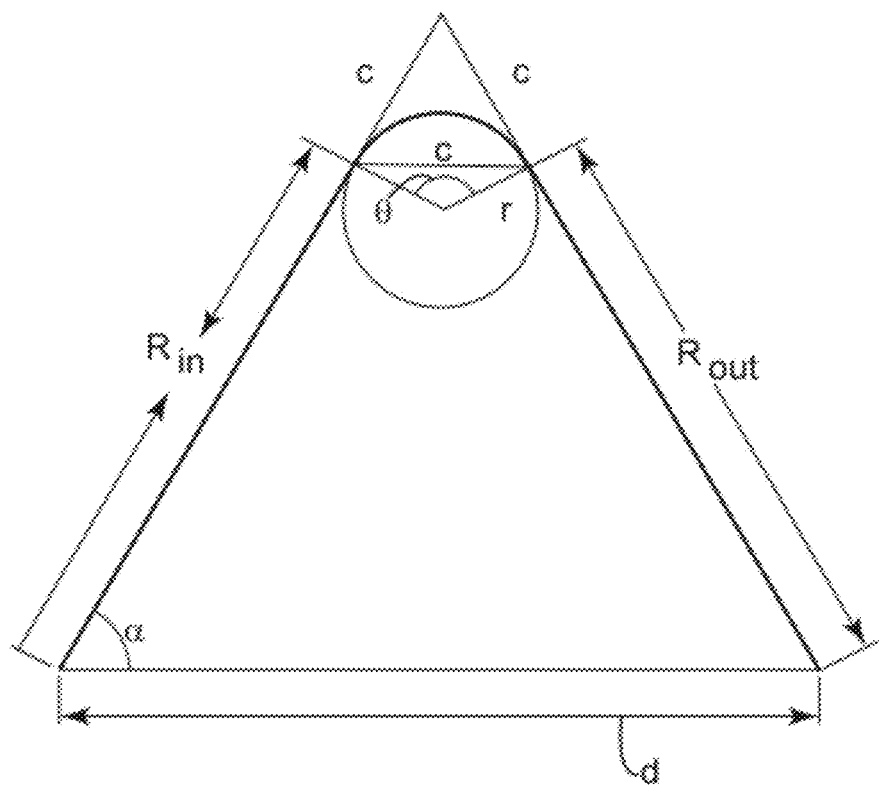
FIG. 11 is a schematic diagram illustrating a turning of a vessel according to an exemplary embodiment.

However, the optimal radius of a hexagonal cell may also be calculated as discussed next. According to an exemplary embodiment, a cell is considered efficient when the majority of the line turns are 120°. The turn construction is a function of the arc angle, turn radius, chord length, and run-in/run-out lengths. The run-in length is the distance from the end of the active survey line to the actual turn of the vessel, and the run-out length is the distance from where the vessel has turned to the point where another survey line becomes active (i.e., starts recording). These parameters are illustrated in FIG. 11. The arc angle is "θ", the chord length is "c", the turn radius is "r", the run-in length is "$R_{in}$" and the run-out length is "$R_{out}$".

In an exemplary embodiment, the arc angle is considered to be 120°, the radius r is 5500 m, and the $R_{in}=R_{out}=12100$ m. With these exemplary values, an optimal radius of the hexagon is 2d, where d is a function of "r" and "$R_{in}$" and "θ", i.e., d=f(r, $R_{in}$, θ). For example, d may be equal to $R_{in}$+c. Considering that c is given by 2·r·sin(θ/2), d becomes $R_{in}$+2·r·sin(θ/2). Again, it is noted that all these numbers are exemplary and they depend on the length of the streamers and other factors.

Figure 12:
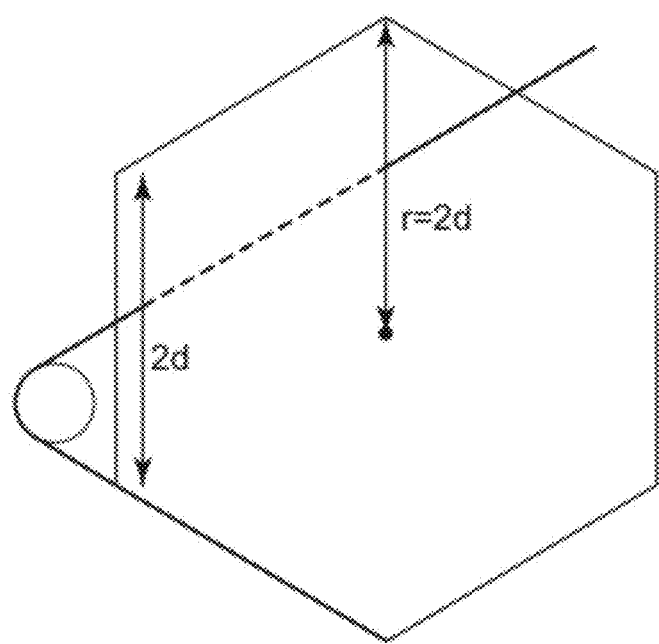
FIG. 12 is a schematic diagram illustrating a turning of a vessel for a hexagonal cell according to an exemplary embodiment.

Thus, once the turn radius and run-in/run-out are known, the optimal cell size can be determined as shown in FIG. 12. The optimal cell should have a radius roughly equivalent to 2 times the "d" value shown in FIG. 11 in order to fix most turns to 120°. Using the numbers of the previous paragraph, a radius of the hexagonal cell is found to be 43.2 km. For this radius, most line turns are 120°, with some 180° turns toward the apexes of the cell where turn efficiency of 180° is better. This cell also has a better symmetry of line grouping by direction.

Thus, it is noted that the empirical and mathematical models converge. However, the above calculations are based on 12 km run-in and 5.5 km turn radius associated with a 12 km streamer length. Shorter cable lengths with subsequently shorter run-outs and turn radii will have a smaller hexagonal radius. For example, a 10 km streamer would have a 39.1 km optimal radius equivalent to 3979 sq km or 171 blocks. Thus, the optimal hexagon is between 40 and 50 km; however, due to the very large area to cover, the 50 km cell is likely not the preferred solution from an industry point of view.

Having discussed a novel configuration for seismic data acquisition and also a novel pre-plot cell and how to calculate its optimal size, a method for implementing the seismic data acquisition and a method for determining the radius of the cell are now discussed in the following embodiments.

Figure 13:
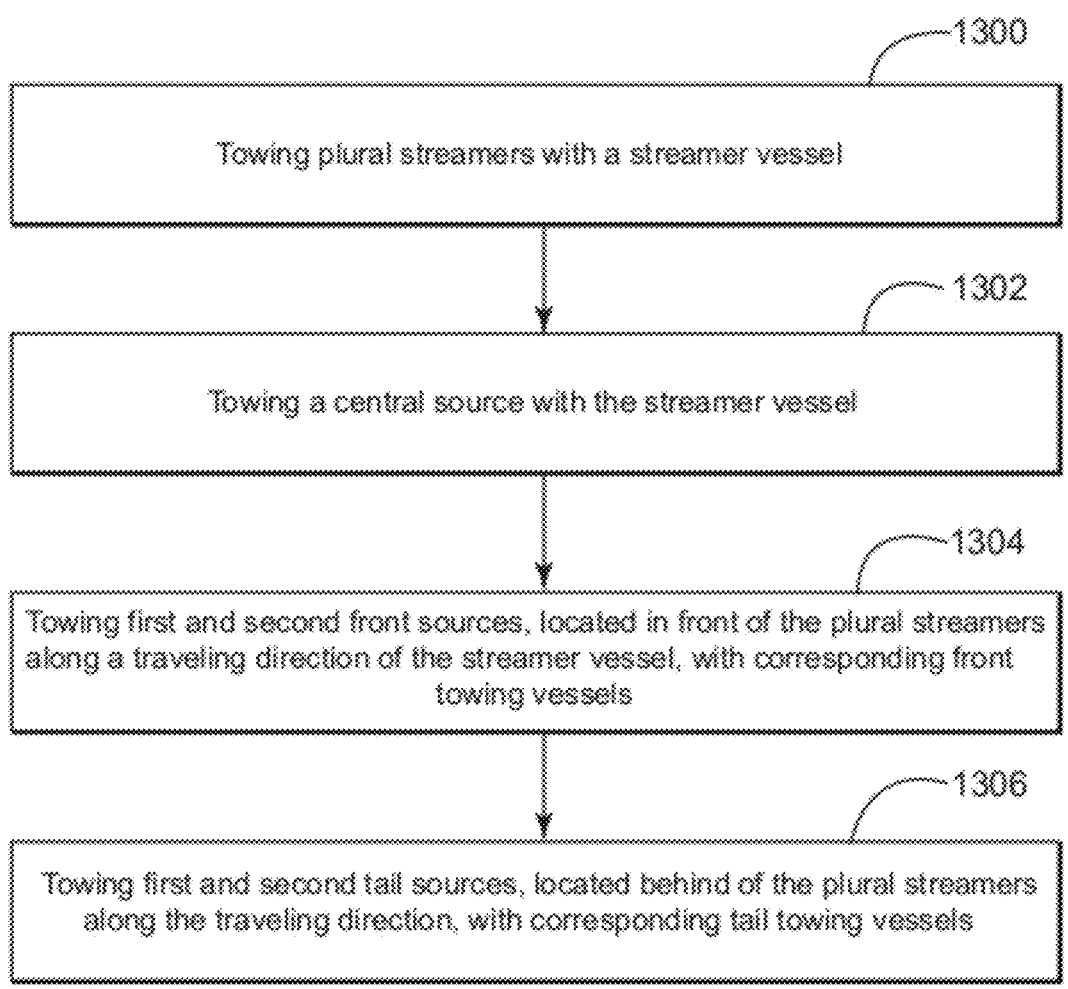
FIG. 13 is a flowchart of a method for towing multiple sources with multiple vessels according to an exemplary embodiment.

According to an exemplary embodiment illustrated in FIG. 13, there is a method for seismic data acquisition that includes a step 1300 of towing plural streamers (112) with a streamer vessel (102); a step 1302 of towing a central source (114) with the streamer vessel (102); a step 1304 of towing first and second front sources (104a, 106a), located in front of the plural streamers (112) along a traveling direction (X) of the streamer vessel (102), with corresponding front towing vessels; and a step 1306 of towing first and second tail sources (108a, 110a), located behind the plural streamers (112) along the traveling direction (X), with corresponding tail towing vessels. An offset distance (D2) between the first and second tail sources (108a, 110a), along a cross-line direction (Y), is larger than an offset distance (D1) between the first and second front sources (104a, 106a). Such a method and configuration increases an azimuth distribution while also achieving a high fold.

Figure 14:
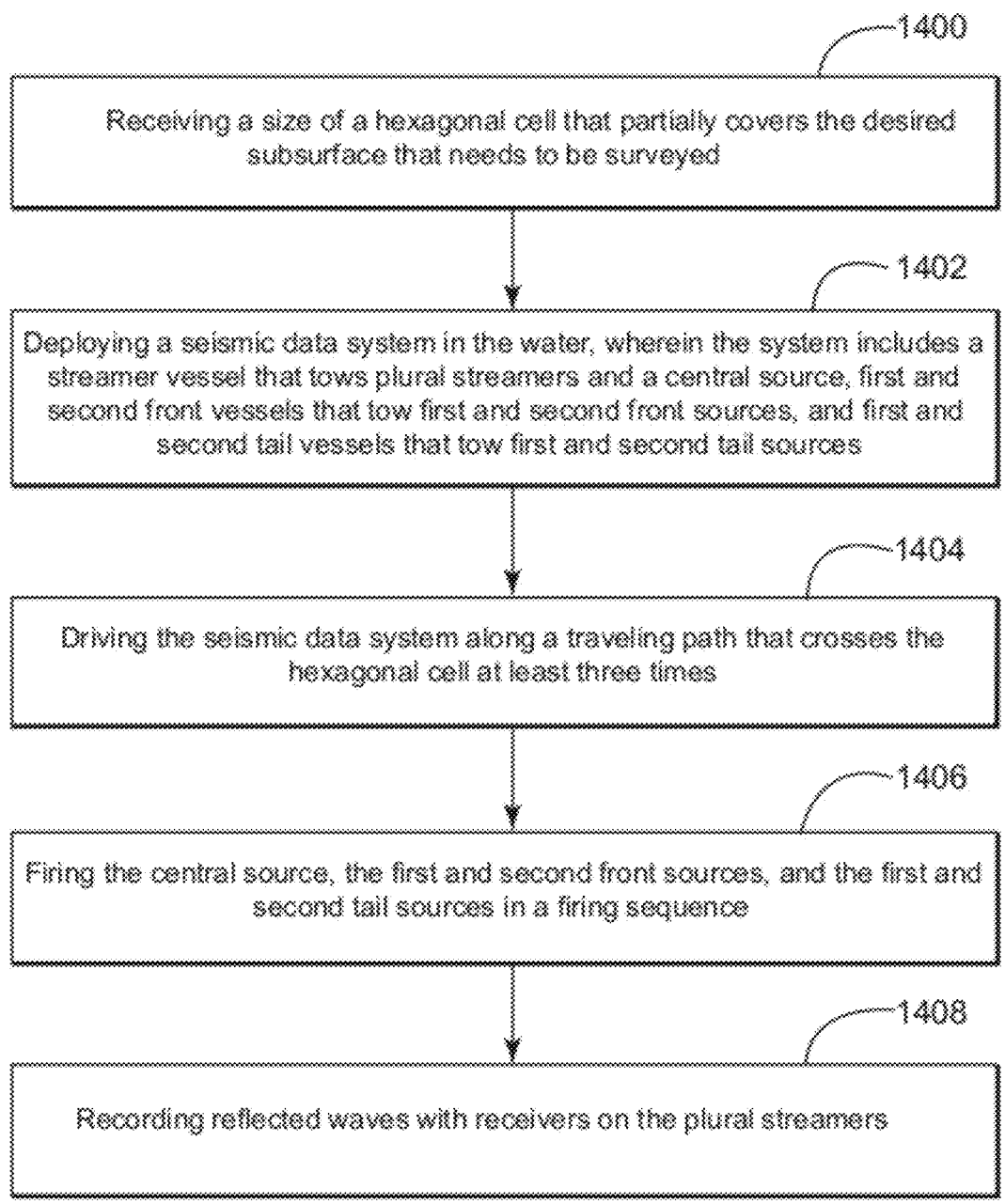
FIG. 14 is a flowchart of a method for driving a seismic data acquisition system over a hexagonal cell according to an exemplary embodiment.

According to another exemplary embodiment illustrated in FIG. 14, there is a method for seismic data acquisition with increased azimuth distribution of a desired subsurface under water. The method includes a step 1400 of receiving a size of hexagonal cell that partially covers the desired subsurface that needs to be surveyed; a step 1402 of deploying a seismic data system in the water, wherein the system includes a streamer vessel that tows plural streamers and a central source, first and second front vessels that tow first and second front sources, and first and second tail vessels that tow first and second tail sources; a step 1404 of driving the seismic data system along a traveling path that crosses the hexagonal cell at least three times; a step 1406 of firing the central source, the first and second front sources, and the first and second tail sources in a firing sequence; and a step 1408 of recording reflected waves with receivers on the plural streamers.

Figure 15:
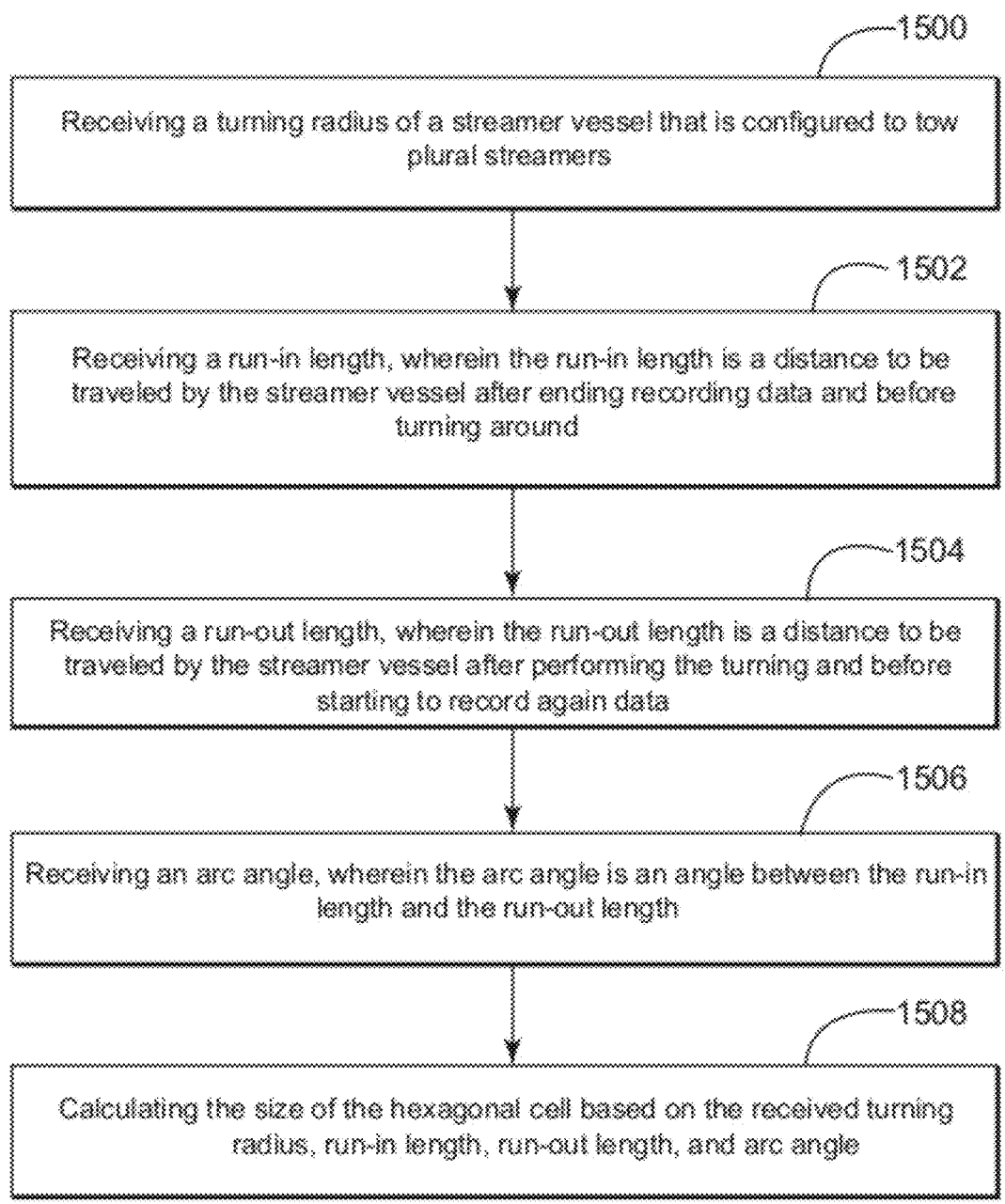
FIG. 15 is a flowchart of a method for calculating the size of a hexagonal cell according to an exemplary embodiment.

Determining the size of the hexagonal cell may also be achieved in a method as discussed next. According to this exemplary embodiment, illustrated in FIG. 15, there is a method for determining the size of a hexagonal cell to be used for partially covering a desired subsurface when performing a seismic survey. The method includes a step 1500 of receiving a turning radius r of a streamer vessel that is configured to tow plural streamers; a step 1502 of receiving a run-in length, wherein the run-in length is a distance to be traveled by the streamer vessel after ending recording data and before turning around; a step 1504 of receiving a run-out length, wherein the run-out length is a distance to be traveled by the streamer vessel after performing the turn and before starting to record data again; a step 1506 of receiving an arc angle, wherein the arc angle is an angle between the run-in length and the run-out length; and a step 1508 of calculating the size of the hexagonal cell based on the received turning radius, run-in length, run-out length and arc angle. The size of the hexagonal cell is the distance from a central point of the hexagonal cell to an apex of the hexagonal cell.

Figure 16:
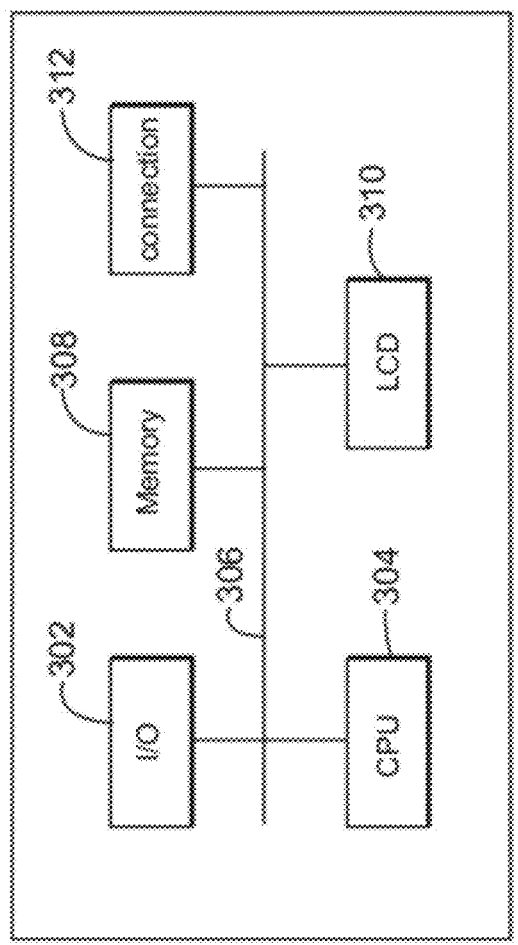
FIG. 16 is a schematic diagram of a computerized system that implements various methods according to an exemplary embodiment.

One or more of the methods discussed above may be implemented in a computerized system as shown in FIG. 16. Such a computerized system 300 may receive, via the input/output interface 302, information pertinent to positions of the sources and/or streamers, the arc angle, the turning radius, the run-in length, the run-out length, etc. In addition, the computerized system 300 may include a processor 304 for processing the above-noted data and for calculating, for example, the size of a hexagonal cell. The interface 302 and the processor 304 are connected to a bus 306. Further, the computerized system 300 may include a memory 306 to store the above-noted data, a display 310, a connection 312 to the streamers and/or the sources, and other elements common for a computerized system or server as would be recognized by those skilled in the art.

The above-disclosed exemplary embodiments provide a system and a method for improving azimuth distribution for seismic data acquisition and also for calculating the size of a hexagonal cell to be used to cover a desired subsurface of the water. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. Further, it is noted that the above embodiments may be implemented in software, hardware or a combination thereof.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A survey acquisition system comprising:
plural streamers towed by a streamer vessel;
a central source towed by the streamer vessel;
first and second front sources towed by corresponding first and second front vessels that are located in front of the plural streamers along a traveling direction (X) of the streamer vessel; and
first and second tail sources located behind the plural streamers along the traveling direction (X), wherein the first and second tail sources are towed by corresponding first and second tail vessels,
wherein an offset distance (D2) between the first and second tail vessels, along a cross-line direction (Y), is larger than an offset distance (D1) between the first and second front vessels,
wherein the first and second front vessels do not tow streamers, and
wherein the plural streamers are located between the first and second front sources towed by the corresponding first and second front vessels and between the first and second tail sources towed by the corresponding first and second tail vessels.

2. The system of claim 1, wherein the first and second front sources are offset by a predetermined first distance along the traveling direction.

3. The system of claim 2, wherein the first and second tail sources are offset by a predetermined second distance along the traveling direction.

4. The system of claim 3, wherein the first front source and the central source are offset by a predetermined third distance along the traveling direction.

5. The system of claim 1, wherein the plural streamers are fanned out so that two adjacent streamers make with each other an angle of at least 2 degrees.

6. The system of claim 1, wherein at least a streamer of the plural streamers has a first curved portion and a second flat portion, and an inline distance between an end of the plural streamers and one of the first and second tail sources is equal to or larger than a length of the flat portion.

7. The system of claim 1, wherein an inline distance between the first front source and the central source is equal to an inline distance between the central source and the second front source and is equal to an inline distance between the first tail source and the second tail source.

8. The system of claim 7, wherein the inline distances among the front sources and the central source are calculated based on a traveling speed of the streamer vessel such that when these sources are fired sequentially, each source is fired at the same inline position during one firing sequence.

9. A method for seismic data acquisition comprising:
towing plural streamers with a streamer vessel;
towing a central source with the streamer vessel;
towing first and second front sources, located in front of the plural streamers along a traveling direction (X) of the streamer vessel, with corresponding first and second front towing vessels; and
towing first and second tail sources, located behind the plural streamers along the traveling direction (X), with corresponding first and second tail towing vessels,
wherein an offset distance (D2) between the first and second tail vessels, along a cross-line direction (Y), is larger than an offset distance (D1) between the first and second front vessels,
wherein the first and second front towing vessels do not tow streamers, and
wherein the plural streamers are located between the first and second front sources towed by the corresponding first and second front vessels and between the first and second tail sources towed by the corresponding first and second tail towing vessels.

10. The method of claim 9, further comprising:
offsetting the first and second front sources by a predetermined first distance along the traveling direction.

11. The method of claim 10, further comprising:
offsetting the first and second tail sources by a predetermined second distance along the traveling direction.

12. The method of claim 11, further comprising:
offsetting the first front source and the central source by a predetermined third distance along the traveling direction.

13. The method of claim 9, further comprising:
fanning the plural streamers out so that two adjacent streamers make with each other an angle of at least 2 degrees.

14. The method of claim 9, further comprising:
offsetting one of the first and second tail sources relative to an end of the plural streamers by a distance that is equal to or larger than a length of a flat portion of the plural streamers,
wherein at least one streamer of the plural streamers has a first curved portion and the second flat portion.

15. The method of claim 9, further comprising:
setting up an inline distance between the first front source and the central source to be equal to an inline distance between the central source and the second front source and to be equal to an inline distance between the first tail source and the second tail source.

16. The method of claim 15, further comprising:
calculating the inline distances among the front sources and the central source based on a traveling speed of the streamer vessel such that when these sources are fired sequentially, each source is fired at the same inline position in one firing sequence.

17. A survey acquisition system comprising:
a streamer vessel;
plural streamers towed by the streamer vessel;
a central source towed by the streamer vessel;
first and second front vessels;
first and second front sources located in front of the plural streamers along a traveling direction (X) of the streamer vessel and configured to be towed by the first and second front vessels;
first and second tail vessels; and
first and second tail sources located behind the plural streamers along the traveling direction (X), and configured to be towed by the first and second tail vessels,
wherein an offset distance (D2) between the first and second tail sources, along a cross-line direction (Y), is larger than an offset distance (D1) between the first and second front sources,
the first and second front sources are offset by a predetermined first distance along the traveling direction,
the first and second tail sources are offset by a predetermined second distance along the traveling direction, the first front source and the central source are offset by a predetermined third distance along the traveling direction, and the plural streamers are located between the first and second front sources towed by the corresponding first and second front vessels and between the first and second tail sources towed by the corresponding first and second tail vessels.

18. The system of claim 17, wherein the plural streamers are fanned out so that two adjacent streamers make with each other an angle of at least 2 degrees, at least one streamer of the plural streamers has a first curved portion and a second flat portion and an inline distance between an end of the plural streamers and one of the first and second tail sources is equal to or larger than a length of the flat portion of the plural streamers, and an inline distance between the first front source and the central source is equal to an inline distance between the central source and the second front source and is equal to an inline distance between the first tail source and the second tail source.

19. The system of claim 17, wherein the inline distances among the front sources and the central source are calculated based on a traveling speed of the streamer vessel such that when these sources are fired sequentially, each source is fired at the same inline position in one firing sequence.

20. The system of claim 17, wherein each source includes one or more air guns.

* * * * *